Dec. 12, 1944.   F. P. MASON   2,364,802
ALTERNATING CURRENT SUPPLY
Filed Dec. 21, 1942

Inventor
F. P. Mason
By James N. Curtin
Attorney

Patented Dec. 12, 1944

2,364,802

UNITED STATES PATENT OFFICE 2,364,802

ALTERNATING CURRENT SUPPLY

Frederick Percival Mason, Croydon, England, assignor to Creed and Company Limited, Croydon, England Application December 21, 1942, Serial No. 469,687
In Great Britain November 7, 1941

3 Claims. (Cl. 171—97)

This invention relates to improvements in alternating current supply systems particularly applicable to an arrangement for supplying telegraph signalling current in a telegraph system employing apparatus driven by a direct current electric motor.

It is an object of the invention to derive the telegraph signalling current from the battery which supplies current to said motor thus eliminating the need for a separate battery or other source for signalling purposes.

Motor driven telegraph apparatus is usually driven by a fractional horse power direct current motor, the energy from which is derived from a battery of lower voltage than that required for signalling purposes. In order, therefore, to derive the signalling voltage (or voltages in the case of double current signalling) from this battery it is necessary to interrupt the current periodically and to pass the interrupted current through the primary of a transformer, the secondary of which is connected through a rectifier and smoothing circuit to the signalling load.

The present invention provides an arrangement for deriving telegraph signalling voltage from a battery of different voltage in which contacts controlling the flow of current from the battery to a motor driving a telegraph apparatus are caused to commutate the supply from the said battery to a network from which the telegraph signalling current is derived.

By means of the invention not only is the need for a separate source for signalling purposes eliminated, but the need for additional contacts to interrupt the current from the battery is dispensed with. Moreover, energy which is normally dissipated in the electric motor circuit is usefully employed.

The operation of the arrangement according to the invention depends on the fact that, in an electrical governor, in which a contact used for interrupting the supply to a motor is operated by centrifugal force, the contact will make and break regularly substantially once per revolution of the motor, on account of the effect of gravity and vibration. Since the majority of motors used for driving telegraph signalling apparatus operate at speeds of the order of 3,000 R. P. M., the governor contact makes and breaks approximately fifty times per second.

Figure 1:
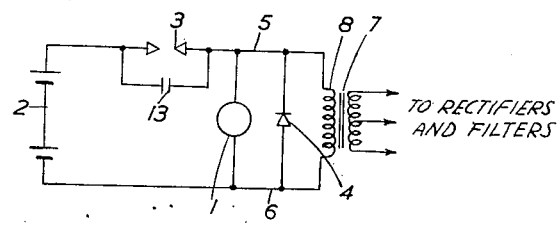
Figure 2:
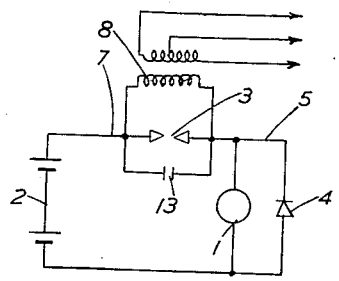
Figure 3:
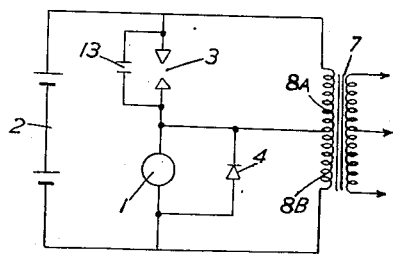

The nature of the invention will be better understood from the following description taken in conjunction with the accompanying drawing in which Figs. 1, 2 and 3 show three different embodiments of the invention.

Referring to Fig. 1, the telegraph apparatus motor 1 is energised by a battery 2 under the control of centrifugally operated contacts 3. These contacts are normally closed under the action of a spring, and are separated by the centrifugal force set up by a mass carried eccentrically on the motor shaft.

In order that the centrifugally operated contacts are effective for controlling the speed of the motor within the narrow limits demanded by telegraph apparatus, the mass is delicately poised so that a very small change in speed will cause the out-of-balance force between the spring tension and centrifugal force to change direction.

As a result of the sensitivity of the contact moving system, it is found that the contacts are subject to cyclic operation, due to the small degree of vibration normally existent in commercial high speed fractional horse-power motors. In the case of motors mounted so that their shafts are not vertical, it is found that the effect of gravity on the eccentric mass also gives rise to cyclic operation of the contacts.

The contacts, therefore, make and break substantially once per revolution of the motor shaft. During the period of one revolution, the contacts are made for a certain interval, and broken for the remainder of the period. The ratio between the "make" and "break" periods is such that the average current during the revolution is just sufficient to produce the torque required to drive the load. In normal practice this ratio may vary over a range of ten to one, according to the value of the load and voltage.

The current in the motor 1 will contain two distinct transients for each revolution. The first transient is that initiated by the closure of contacts 3, when the current increases exponentially. The second transient occurs after separation of contacts 3, the magnetic flux in motor 1 decreasing in value and setting up an E. M. F. within its windings. This E. M. F. is prevented from reaching a high value in an attempt to create an arc across contacts 3 by the provision of a rectifier 4, e. g., a metal rectifier, which offers an alternative path to the current set up by the transient E. M. F. in motor 1. The rectifier does not, however, offer a path to current set up by the E. M. F. of battery 2, so that there is no wastage of battery current through the rectifier. The effect of the rectifier is to prolong the current through the motor for a short time after the separation of contacts 3, and thus utilizes the stored energy in the magnetic field of the motor, instead of allowing this energy to be dissipated as hysteresis loss and arcing loss such as occurs when the field collapses rapidly in the absence of a rectifier.

Since, immediately upon separation of contacts 3, rectifier 4 effectively short-circuits motor 1, there can be no potential between conductors 5 and 6 during separation of the contacts.

Also, since conductor 6 is connected to negative battery and conductor 5 is connected to positive battery via contacts 3, the full potential of battery 2 exists between conductors 5 and 6 during closure of the contacts.

Thus, the primary winding 8 of transformer 7, since it is connected across conductors 5 and 6, will experience zero potential and battery potential alternately, the frequency of alternation corresponding substantially to the frequency of rotation of the motor.

Since the characteristics of the equivalent circuit of transformer 7 are of the same order as those of the equivalent circuit of motor 1, the current flowing in the primary winding 8 will be of the same wave form as that in the motor. The magnetic flux will, therefore, alternate in magnitude between two values and set up secondary currents, which may be rectified and filtered in well-known manner to provide a supply of telegraph signalling current.

It is desirable that the effective time constant of the transformer 7 and the following rectifier and filter combination should be of the order of one-quarter of a motor revolution period, in order to ensure a full current transient when the make or break period of contact 3 is reduced to this amount under extreme conditions of motor load or voltage. This relationship will ensure that the telegraph signalling voltage is reasonably independent of the load on the motor.

Where the motor voltage and load are reasonably steady, use may be made of the arrangement shown in Fig. 2. The components and corresponding index numbers perform exactly the same functions as do those in Fig. 1. In this case, however, the primary winding 8 of the transformer 7 is connected across contacts 3. The potential across the contacts alternates between zero (when the contacts are closed) and a potential dependent upon the ratio of the impedances of components 8 and 1 (when the contacts are open). This arrangement is suitable for use when only a small signalling output is required.

Fig. 3 shows an arrangement combining the characteristics of Figs. 1 and 2. The primary winding of transformer 7 is divided into two portions, one 8A being connected in parallel with the governor contacts 3 and the other 8B connected in shunt to the motor 1 and rectifier 4. Since the potentials across contacts 3 and the motor 1 are in antiphase, the windings 8A and 8B are wound in opposite directions.

What is claimed is:

1. A motor governor commutator system comprising a motor, a direct current feed circuit for the motor, separable contacts in the circuit, a motor speed governor controlling said contacts arranged to close and open the contacts at frequent intervals, a rectifier connected in shunt across the motor and means for deriving alternating current from said circuit comprising a transformer connected with its primary winding in circuit with said contacts.

2. A motor governor commutator system as set forth in claim 1, in which the transformer primary comprises two opposed sections, one connected in shunt to said contacts and the other connected in shunt to said motor.

3. An alternating current generating system comprising a motor, a direct current feed circuit connected to the motor, separable contacts in series in said circuit, a motor speed governor controlling said contacts arranged to close and open the contacts at frequent intervals, a rectifier connected in shunt across the motor, and means for deriving alternating current from said circuit comprising a transformer having a primary winding including two opposed sections, one connected in shunt to said motor and rectifier and the other connected in shunt to said contacts.

FREDERICK PERCIVAL MASON.